United States Patent
Takaoka et al.

(10) Patent No.: US 8,482,187 B2
(45) Date of Patent: Jul. 9, 2013

(54) SPARK PLUG AND PROCESS FOR PRODUCING SPARK PLUG

(75) Inventors: Katsuya Takaoka, Komaki (JP); Hironori Uegaki, Nagoya (JP); Hirokazu Kurono, Nagoya (JP); Toshitaka Honda, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 13/382,116

(22) PCT Filed: Jun. 28, 2010

(86) PCT No.: PCT/JP2010/004263
§ 371 (c)(1),
(2), (4) Date: Apr. 10, 2012

(87) PCT Pub. No.: WO2011/001656
PCT Pub. Date: Jan. 6, 2011

(65) Prior Publication Data
US 2012/0187819 A1 Jul. 26, 2012

(30) Foreign Application Priority Data

Jul. 3, 2009 (JP) ................................. 2009-159330

(51) Int. Cl.
*F02M 57/06* (2006.01)
(52) U.S. Cl.
USPC ............ 313/118; 313/137; 313/141; 313/143
(58) Field of Classification Search
None
See application file for complete search history.

(56) References Cited

U.S. PATENT DOCUMENTS

| | | | |
|---|---|---|---|
| 5,370,832 A * | 12/1994 | Sugimoto et al. | 264/647 |
| 5,384,293 A | 1/1995 | Omori et al. | |
| 6,407,487 B1 | 6/2002 | Sugimoto | |
| 6,559,579 B2 * | 5/2003 | Ito et al. | 313/143 |
| 6,632,381 B2 | 10/2003 | Sugimoto | |
| 8,183,754 B2 * | 5/2012 | Kuribayashi et al. | 313/118 |
| 2002/0024160 A1 | 2/2002 | Sugimoto | |

(Continued)

FOREIGN PATENT DOCUMENTS

| | | |
|---|---|---|
| EP | 0 982 820 A1 | 3/2000 |
| EP | 1 005 125 B1 | 1/2011 |

(Continued)

OTHER PUBLICATIONS

Supplementary European Search Report dated May 2, 2013 for corresponding European patent application No. 10 79 3830.

*Primary Examiner* — Mary Ellen Bowman
(74) *Attorney, Agent, or Firm* — Sughrue Mion, PLLC

(57) ABSTRACT

A spark plug which exhibits high dielectric strength at high temperature and which is unlikely to be deteriorated in dielectric strength is provided. The spark plug includes a center electrode, an insulator, and a metallic shell. The insulator includes an alumina-based sintered body which contains a silicon component, a Group II element component, and a rare earth element component. The alumina-based sintered body is composed of a glass phase and an alumina crystal phase as observed through X-ray diffraction analysis. When the grain boundary phase of the alumina-based sintered body is observed under a transmission electron microscope, and the weight ratio between an alkali metal component and the rare earth element component as reduced to oxides thereof [alkali metal/rare earth element] is calculated at 30 circular spots, each having a diameter of 0.3 nm, selected arbitrarily in a field of observation, the average of the weight ratios of the 30 spots falls within a range of 0.01 to 1.0.

5 Claims, 2 Drawing Sheets

U.S. PATENT DOCUMENTS

| | | |
|---|---|---|
| 2007/0228915 A1 | 10/2007 | Honda et al. |
| 2007/0298245 A1 | 12/2007 | Ogata et al. |
| 2010/0084960 A1 | 4/2010 | Kurono et al. |
| 2010/0136867 A1 | 6/2010 | Kurono et al. |
| 2012/0007489 A1 | 1/2012 | Kurono et al. |
| 2012/0080996 A1* | 4/2012 | Takaoka et al. ............ 313/141 |
| 2012/0319556 A1* | 12/2012 | Suzuki et al. ............. 313/141 |

FOREIGN PATENT DOCUMENTS

| | | |
|---|---|---|
| JP | 7-12969 B2 | 2/1995 |
| JP | 7-17436 B2 | 3/1995 |
| JP | 11-49571 A | 2/1999 |
| JP | 2951771 B2 | 9/1999 |
| JP | 2001-2464 A | 1/2001 |
| JP | 2001-335360 A | 12/2001 |
| JP | 2007-250379 A | 9/2007 |
| JP | 2008-24583 A | 2/2008 |
| WO | WO 99/44266 A1 | 9/1999 |
| WO | WO 2005/033041 A1 | 4/2005 |
| WO | 2009119097 A1 | 10/2009 |
| WO | 2009119098 A1 | 10/2009 |

* cited by examiner

US 8,482,187 B2

SPARK PLUG AND PROCESS FOR PRODUCING SPARK PLUG

CROSS REFERENCE TO RELATED APPLICATIONS

This application is a National Stage of International Application No. PCT/JP2010/004263 filed Jun. 28, 2010, claiming priority based on Japanese Patent Application No. 2009-159330, filed Jul. 3, 2009, the contents of all of which are incorporated herein by reference in their entirety.

TECHNICAL FIELD

The present invention relates to a spark plug and a method of manufacturing the spark plug and particularly to a spark plug which exhibits high dielectric strength at high temperature and which is unlikely to be deteriorated in dielectric strength at high temperature, as well as a method of manufacturing the spark plug.

BACKGROUND ART

Conventionally, various techniques have been developed for improving dielectric strength of insulators which contain alumina.

For example, Patent Document 1 discloses a highly insulating high-alumina-content ceramic composition which contains "a material powder mixture composed of an alumina powder having a particle size of 0.5 μm or less and at least one additive selected from among $Y_2O_3$, $ZrO_2$, and $La_2O_3$, or a solid solution composite oxide of alumina and at least one additive selected from among $Y_2O_3$, $ZrO_2$, and $La_2O_3$" (refer to claim 1 of Patent Document 1).

Patent Document 2 discloses "an alumina ceramic composed of alumina ($Al_2O_3$) having an average grain size of 1 μm or less and at least one of compounds and mixtures of $Al_2O_3$ with at least one of yttria ($Y_2O_3$), magnesia (MgO), zirconia ($ZrO_2$), and lanthanum oxide ($La_2O_3$) formed in a grain boundary phase, the alumina ceramic having a porosity of 6 volume % or less" (refer to claim 1 of Patent Document 2).

Patent Document 3 discloses "a high dielectric strength alumina-based sintered body which satisfies the relationship: $0.95 \geq S/(S+C+M) \geq 0.75$, where S (unit: parts by weight), C (unit: parts by weight), and M (unit: parts by weight) are the Si component content, the Ca component content, and the Mg component content, respectively, as reduced to oxides thereof per 100 parts by weight of alumina-based sintered body and which has a mullite ($Al_6Si_2O_{13}$) crystal phase" (refer to claim 1 of Patent Document 3).

Patent Document 4 discloses "a rare earth oxide-alumina-silica sintered body which contains 5 wt % to 95 wt % rare earth oxide, 94.9 wt % to 4.9 wt % alumina, and 0.1 wt % to 10 wt % silica and which is characterized in that the crystal grain size is 30 μm or less" (refer to claim 1 of Patent Document 4).

Patent Document 5 discloses "an insulator for a spark plug characterized by containing, per 100% by mass of all components, an Al component in an amount of 95% by mass to 99.8% by mass and a rare earth element(s) and an Si component in such an amount that the amount ratio ($R_{RE}/R_{si}$) between the rare earth element(s) ($R_{RE}$) and the Si component ($R_{si}$) is 0.1 to 1.0, and characterized in that the number of alumina grains having a maximum length of 10 μm or greater and an aspect ratio of 3 or greater is less than 10 as counted in a cut area of 1 $mm^2$" (refer to claim 1 of Patent Document 5).

Patent Document 6 discloses "an aluminous ceramic composition which is formed of a composite sintered body of alumina serving as a main component with at least one element selected from among Al, Si, Mg, and rare earth elements, the aluminous ceramic composition being characterized in that the at least one element selected from among Al, Si, Mg, and rare earth elements is contained in an amount of 5 parts by weight or less per 100 parts by weight of alumina, serving as a main component" (refer to claim 1 of Patent Document 6).

Patent Document 7 discloses components other than alumina used in a spark plug for use in an internal combustion engine as follows: "an additive element material powder comprises one or more components selected from among an Si component, a Ca component, an Mg component, a Ba component, and a B component . . . . The additive element material powder is prepared for mixing in such an amount that the total amount of the components as reduced to oxides thereof is 4% by mass to 7% by mass . . . . The additive element material powders prepared incorporated into the composition can be, for example, an $SiO_2$ powder for the Si component, a $CaCO_3$ powder for the Ca component, an MgO powder for the Mg component, a $BaCO_3$ powder for the Ba component, and an $H_3BO_3$ powder (or aqueous solution) for the B component . . . . The additive element material powders for the Si, Ca, Mg, and Ba components can be, in addition to oxide powders, inorganic material powders, such as hydroxide powders, carbonate powders, chloride powders, sulfate powders, nitrate powders, and phosphate powders" (refer to Section 0055 of Patent Document 7).

Meanwhile, there has been awaited a spark plug that is superior in dielectric strength to the above-mentioned conventional spark plugs, and, more particularly, a spark plug which exhibits excellent dielectric strength at high temperature at which dielectric breakdown is apt to arise and which is unlikely to be deteriorated in dielectric strength at high temperature, as well as a method of efficiently manufacturing the spark plug.

PRIOR ART DOCUMENTS

Patent Documents

Patent Document 1: Japanese Patent Publication (kokoku) No. H07-17436
Patent Document 2: Japanese Patent Publication (kokoku) No. H07-12969
Patent Document 3: Japanese Patent Application Laid-Open (kokai) No. 2001-2464
Patent Document 4: Japanese Patent No. 2951771
Patent Document 5: Japanese Patent Application Laid-Open (kokai) No. 2001-335360
Patent Document 6: WO 2005/033041
Patent Document 7: Japanese Patent Application Laid-Open (kokai) No. 2007-250379

SUMMARY OF THE INVENTION

Problems to be Solved by the Invention

An object to be attained by the present invention is to provide a spark plug having an insulator which exhibits high dielectric strength at high temperature and which is unlikely to be deteriorated in dielectric strength at high temperature.

Another object to be attained by the present invention is to provide a spark plug having an insulator which exhibits high dielectric strength at high temperature while maintaining thermal shock resistance and sinterability.

Still another object to be attained by the present invention is to provide a spark plug having an insulator which exhibits high dielectric strength at high temperature and is unlikely to give rise to high-temperature leakage while maintaining thermal shock resistance and/or sinterability.

A further object to be attained by the present invention is to provide a method of manufacturing a spark plug which can efficiently manufacture the above-mentioned spark plug.

Means for Solving the Problems

Means for solving the above problems are as follows:

(1) A spark plug comprising a center electrode, a substantially cylindrical insulator provided externally of an outer circumference of the center electrode, and a substantially cylindrical metallic shell provided externally of an outer circumference of the insulator, characterized in that the insulator is formed of an alumina-based sintered body which contains a silicon component (hereinafter, referred to as an Si component), a Group II element component of the Periodic Table following IUPAC 1990 Recommendations, and a rare earth element component (hereinafter, referred to as an RE component);

the alumina-based sintered body is composed of a glass phase and an alumina crystal phase as observed through X-ray diffraction analysis; and when the grain boundary phase of the alumina-based sintered body is observed under a transmission electron microscope, and the ratio by mass between an alkali metal component and the RE component as reduced to oxides thereof [alkali metal/RE] is calculated at 30 circular spots, each having a diameter of 0.3 nm, selected arbitrarily in a field of observation, the average of the ratio by mass of the 30 spots falls within a range of 0.01 to 0.45 or within a range of 0.45, not inclusive, to 1.0.

(2) A spark plug described above in (1), wherein, in the alumina-based sintered body, the ratio by mass between the RE component and the Si component as reduced to oxides thereof satisfies a relationship: $0.45 \leq RE/SiO_2 \leq 1.2$.

(3) A spark plug described above in (1) or (2), wherein, in the alumina-based sintered body, the ratio by mass between an $SiO_2$ component and a combination of the $SiO_2$ component and the Group II element component as reduced to oxides thereof satisfies a relationship: $0.2 \leq SiO_2/(SiO_2+Group\ II) \leq 0.75$.

(4) A spark plug described above in any one of (1) to (3), wherein, in the alumina-based sintered body, alumina grains contained therein have an average grain size of 2.5 μm to 6 μm, and when an arbitrary region of the alumina-based sintered body is line-analyzed along a length of 180 μm, eight or more peaks attributable to the RE component are observed.

(5) A method of manufacturing a spark plug as recited in any one of (1) to (4), comprising:

a firing step of forming an insulator through firing of a green compact;

a center electrode attachment step of attaching a center electrode to the insulator; and a metallic shell attachment step of attaching, to a metallic shell, the insulator to which the center electrode is attached;

the method being characterized in that, in the firing step, temperature is raised from 900° C. to a firing temperature at an average temperature elevation rate of 8° C./min to 20° C./min and that the firing temperature is maintained within a temperature range of 1,510° C. to 1,650° C.

Effects of the Invention

The present invention can provide a spark plug having an insulator which exhibits high dielectric strength at high temperature and which is unlikely to be deteriorated in dielectric strength at high temperature.

The present invention can provide a spark plug having an insulator which exhibits high dielectric strength at high temperature while maintaining thermal shock resistance and sinterability.

Furthermore, the present invention can provide a spark plug having an insulator which exhibits high dielectric strength at high temperature and which is unlikely to give rise to high-temperature leakage, while maintaining thermal shock resistance and/or sinterability.

Also, the present invention can provide a method of manufacturing a spark plug which can efficiently manufacture the above-mentioned spark plug.

BRIEF DESCRIPTION OF THE DRAWINGS

FIG. 1 is a pair of explanatory views showing a spark plug according to an embodiment of the present invention, wherein FIG. 1(a) is a partially sectional view showing the spark plug of the embodiment, and FIG. 1(b) is a sectional explanatory view showing a front end portion of the spark plug; and FIG. 2 is a pair of views showing an example apparatus for measuring the dielectric strength, at high temperature, of an insulator of a spark plug according to the present invention, wherein FIG. 2(a) is a top view showing a sintered body and a metal ring, and FIG. 2(b) is a sectional view showing the sintered body and the ring.

MODES FOR CARRYING OUT THE INVENTION

Figure 1:
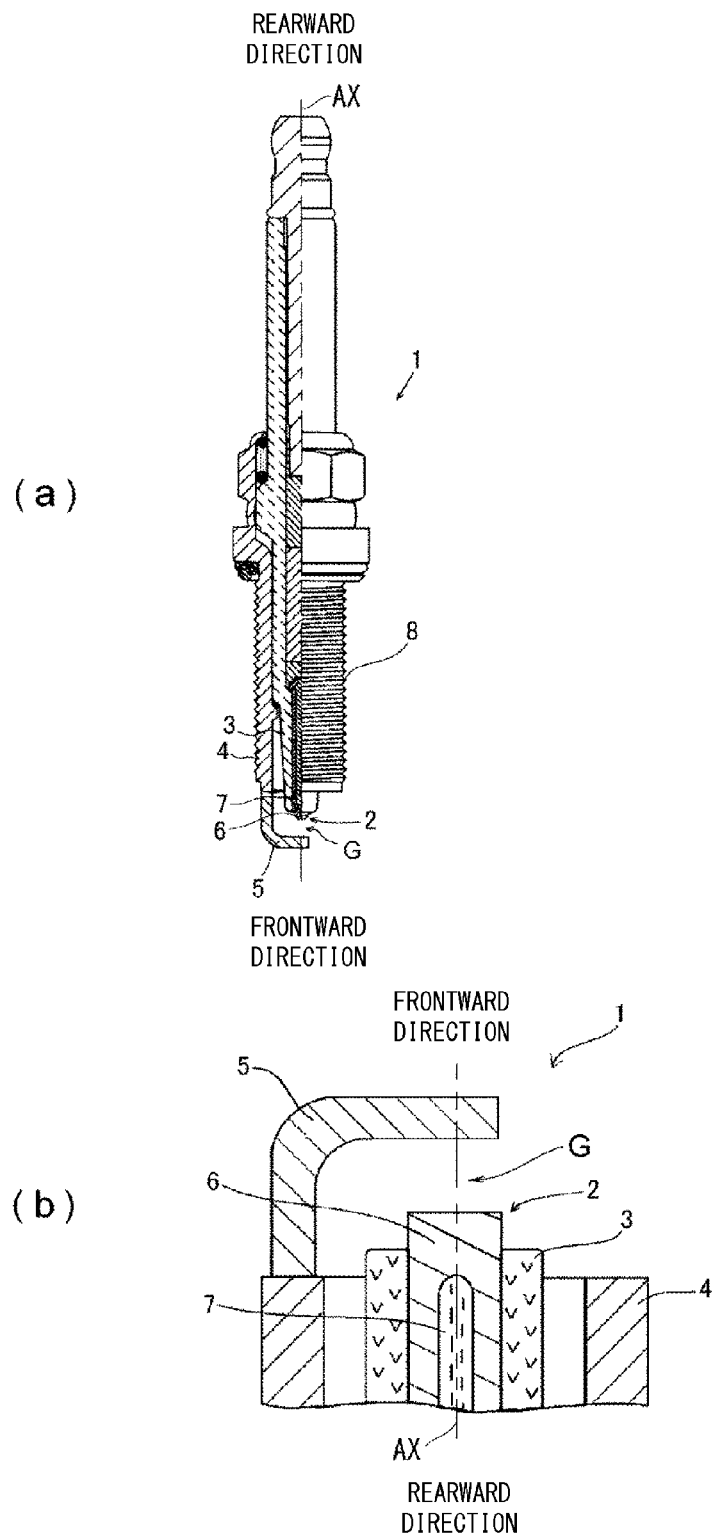

The spark plug according to the present invention includes a center electrode, a substantially cylindrical insulator provided externally of the outer circumference of the center electrode, and a substantially cylindrical metallic shell provided externally of the outer circumference of the insulator. The spark plug is characterized in that: the insulator includes an alumina-based sintered body which contains a silicon component (hereinafter, referred to as an Si component), a Group II element component of the Periodic Table following IUPAC 1990 Recommendations, and a rare earth element component (hereinafter, referred to as an RE component); the alumina-based sintered body is composed of a glass phase and an alumina crystal phase as observed through X-ray diffraction analysis; and when the grain boundary phase of the alumina-based sintered body is observed under a transmission electron microscope, and the ratio by mass between an alkali metal component and the RE component as reduced to oxides thereof [alkali metal/RE] is calculated at 30 circular spots, each having a diameter of 0.3 nm, selected arbitrarily in a field of observation, the average of the ratio by mass of the 30 spots falls within a range of 0.01 to 0.45 or within a range of 0.45, not inclusive, to 1.0; i.e., within a range of 0.01 to 1.0.

The alumina-based sintered body contains the Si component, a Group II element component (hereinafter, may be referred to simply as "Group II component") of the Periodic Table following IUPAC 1990 Recommendations, the RE component, and a dominant aluminum component (hereinafter, may be referred to as an Al component), as well as alkali metals as unavoidable impurities. Most of the Al component is contained, in the alumina-based sintered body, in the form of aluminum oxide ($Al_2O_3$); i.e., alumina.

Preferably, the Al component content as reduced to oxide thereof of the alumina-based sintered body falls within a range of 85% by mass to 96% by mass per 100% by mass of the alumina-based sintered body. When the Al component content as reduced to oxide thereof is 85% by mass to 96% by mass, the insulator of the spark plug according to the present invention can maintain dielectric strength at high level.

The Si component is a component originating from a sintering aid and exists in the form of an oxide, ions, etc., in the alumina-based sintered body. In the course of sintering, the Si component melts and assumes usually a liquid phase, thus functioning as a sintering aid for promoting densification of a sintered body. Furthermore, after sintering, in many cases, the Si component forms a low-melting-point glass phase or the like in the grain boundary phase of alumina crystal grains. However, when the alumina-based sintered body contains not only the Si component but also the Group II component and the RE component, which will be described later, the Si component, together with other components, is more likely to form a high-melting-point glass phase or the like in precedence over the low-melting-point glass phase. Thus, since the alumina-based sintered body is unlikely to melt at low temperature, migration or the like, which would otherwise cause dielectric breakdown, is unlikely to arise.

Examples of the material of the Si component include silicon oxide and compounds which form the Si component through firing. Examples of the compounds which include inorganic powders, such as an oxide, a complex oxide, a hydroxide, a carbonate, a chloride, a sulfate, a nitrate, and a phosphate of silicon, as well as natural minerals and the like. A specific example of a preferred compound powder is an $SiO_2$ powder or the like. When a powder other than the above-mentioned oxides is to be used as a compound powder which forms the Si component, the amount of the powder used is the amount in % by mass of the powder as reduced to oxide thereof. The purity and the average particle size of the material powder of the Si component are basically similar to those of a compound powder which forms the Al component.

The Group II component contained in the alumina-based sintered body is a component originating from a sintering aid. The Group II component can be a compound which contains a Group II element of the Periodic Table following IUPAC 1990 Recommendations. The Group II component exists, in the alumina-based sintered body, in the form of an oxide, ions, etc. Similar to the Si component, the Group II component functions as a sintering aid in the course of sintering. Specific examples of the Group II component include a magnesium component (hereinafter, may be referred to as an Mg component), such as magnesium oxide; a calcium component (hereinafter, may be referred to as a Ca component), such as calcium oxide; a strontium component (hereinafter, may be referred to as an Sr component), such as strontium oxide; and a barium component (hereinafter, may be referred to as a Ba component), such as barium oxide. The alumina-based sintered body of the spark plug according to the present invention contains one or more kinds of the Group II component. When the alumina-based sintered body contains the Group II component, the alumina-based sintered body improves in high-temperature strength, which is preferred. More preferably, the alumina-based sintered body contains two or more kinds of Group II components. Particularly preferably, the alumina-based sintered body contains three or more kinds of the Group II component.

No particular limitation is imposed on the material of the Group II component, so long as the material is a Group II element oxide, the oxide being the Group II component, or a compound which forms the Group II component through firing. Examples of the compound which forms the Group II component through firing include inorganic powders, such as oxides, complex oxides, hydroxides, carbonates, chlorides, sulfates, nitrates, and phosphates of Group II elements, as well as natural minerals and the like. Specific examples of the Ca compound powder are a CaO powder and a $CaCO_3$ powder. Specific examples of the Ba compound powder include a BaO powder and a $BaCO_3$ powder.

When a powder other than the above-mentioned oxides is to be used as a compound powder which forms the Group II compound through firing, the amount of the powder used is the amount in % by mass of the powder as reduced to oxide thereof. When the alumina-based sintered body contains a plurality of members of the Group II component, the Group II component content is the total Group II component content. The purity and the average particle size of the Group II component material powder are basically similar to those of the compound powder which forms the Al component.

The RE component is a component originating from a sintering aid and exists, in the alumina-based sintered body, in the form of an oxide, ions, etc. Examples of the RE component are a scandium component (hereinafter, may be referred to as an Sc component); a yttrium component (hereinafter, may be referred to as a Y component), such as an oxide of yttrium; and a lanthanoid component. Specific examples of the RE component contained in the alumina-based sintered body include the Sc component; the Y component; a lanthanum component (hereinafter, may be referred to as an La component), such as an oxide of lanthanum; a cerium component (hereinafter, may be referred to as a Ce component); a praseodymium component (hereinafter, may be referred to as a Pr component); a neodymium component (hereinafter, may be referred to as an Nd component), such as an oxide of neodymium; a promethium component (hereinafter, may be referred to as a Pm component), such as an oxide of promethium; a samarium component (hereinafter, may be referred to as an Sm component); a europium component (hereinafter, may be referred to as an Eu component); a gadolinium component (hereinafter, referred to as a Gd component); a terbium component (hereinafter, may be referred to as a Tb component); a dysprosium component (hereinafter, may be referred to as a Dy component); a holmium component (hereinafter, may be referred to as an Ho component); an erbium component (hereinafter, may be referred to as an Er component); a thulium component (hereinafter, may be referred to as a Tm component); a ytterbium component (hereinafter, may be referred to as a Yb component), such as an oxide of ytterbium; and a lutetium component (hereinafter, may be referred to as an Lu component). Preferred specific RE components are, for example, the La component, the Nd component, the Pr component, the Y component, and the Yb component. Among the RE elements, the La component, the Nd component, the Pr component, the Y component, and the Yb component are small in ion radius and are likely to uniformly disperse together with the Si component within the alumina-based sintered body; thus, conceivably, a high-melting-point glass phase can be formed.

When the RE component is contained in the alumina-based sintered body in the course of sintering, the RE component inhibits excessive grain growth of alumina in the course of sintering and forms, together with the Si component, a glass phase in the grain boundary phase. Since the glass phase formed in the grain boundary phase has a high melting point, the dielectric strength at high temperature of the alumina-based sintered body can be improved, and the high-temperature strength of the alumina-based sintered body can also be improved.

No particular limitation is imposed on the material of the RE component, so long as the material is an oxide of RE, the oxide being the RE component, or a compound which forms the RE component through firing. Examples of the compound which forms the RE component through firing include inorganic powders, such as oxides, complex oxides, hydroxides, carbonates, chlorides, sulfates, nitrates, and phosphates of RE elements, as well as natural minerals and the like.

The RE component content of the alumina-based sintered body is the content in % by mass of the RE component as reduced to oxide thereof. The RE component content to be employed is as follows: the Pr component content is the content in % by mass of the Pr component as reduced to "$Pr_6O_{11}$"; and the RE component content other than the Pr component is the content in % by mass of the RE component as reduced to "$RE_2O_3$." When the alumina-based sintered body contains a plurality of kinds of the RE component, the RE component content is the total RE component content.

When a powder of a compound other than the above-mentioned oxides is to be used as a compound powder which forms the RE compound, the amount of usage of the powder is the amount in % by mass of the compound as reduced to oxide thereof. The purity and the average particle size of the RE component material powder are basically similar to those of a compound powder which forms the Al component. Also, the purity and the average particle size of the compound powder which forms the RE component are basically similar to those of a compound powder which forms the Al component.

In the spark plug according to the present invention, the Al component content, the Si component content, the Group II component content, and the RE component content of the alumina-based sintered body may be measured by, for example, fluorescent X-ray analysis, chemical analysis, or quantitative analysis by means of an electron probe micro analyzer (EPMA), whereby the contents in % by mass of the components as reduced to oxides thereof can be obtained. In the spark plug according to the present invention, the results obtained through fluorescent X-ray analysis or chemical analysis of the alumina-based sintered body substantially coincide with the mixing ratio of material powders.

In the spark plug according to the present invention, the alumina-based sintered body is composed of a glass phase and alumina crystals as observed through X-ray diffraction analysis. That is, a crystal phase of such a level as to be detected by X-ray diffraction does not exist in a grain boundary phase which exists in the alumina-based sintered body. The expression "a crystal phase of such a level as to be detected by X-ray diffraction does not exist" means that the intensity ratio between a strongest peak attributable to alumina and a strongest peak attributable to a crystal phase other than alumina [crystal phase/alumina] is 0 to 0.05. The X-ray diffraction may be performed under the following conditions by use of MiniFlex manufactured by Rigaku Corporation: measuring angle range: 20° to 70°; voltage: 30 kV; current: 15 mA; scanning speed: 1; and step: 0.02.

In order to yield the alumina-based sintered body composed of the glass phase and alumina crystals, the following practice is preferred: a material powder for the Si component is adjusted in BET specific surface area usually to 30 $m^2$/L to 45 $m^2$/L; a material powder for the Group II component is adjusted in BET specific surface area to 28 $m^2$/L to 40 $m^2$/L; the ratio "the material powder for the Group II component/the material powder for the Si component" is adjusted to 0.7 to 1.3; and the material powders are mixed and then fired. Through employment of such large specific surface areas of the material powders, in the course of firing, the material powder for the Si component and the material powder for the Group II component become likely to react easily with each other; as a result, a glass phase is formed, and alumina crystals are generated as a crystal phase. Furthermore, insofar as the crystal phase is subjected to X-ray diffraction, a crystal phase formation substance other than alumina crystals cannot be detected even by X-ray diffraction.

When a crystal phase of such a level as to be detected by X-ray diffraction exists in a grain boundary phase which exists in the alumina-based sintered body, in many cases, the RE component disperses non-uniformly in the alumina-based sintered body. Since the RE component can shut off electrically conducting routes, non-uniform dispersion of the RE component potentially causes variations in dielectric strength, particularly dielectric strength at high temperature. Also, since the existence of a crystal phase causes variations in dielectric constant of the alumina-based sintered body, voltage becomes unlikely to be applied uniformly, resulting in variations in dielectric strength.

Through high-temperature firing of a crystal phase which exists in the grain boundary phase, the crystal phase melts into a glass phase in the grain boundary phase. Through melting of the crystal phase, components contained in the grain boundary phase disperse uniformly in the glass phase, thereby reducing variations in dielectric strength.

Thus, it is preferred for the alumina-based sintered body that the grain boundary phase does not contain a crystal phase. Therefore, preferably, as mentioned above, the intensity ratio between a strongest peak attributable to alumina and a strongest peak attributable to a crystal phase other than alumina [crystal phase/alumina] as obtained by X-ray diffraction is 0 to 0.05.

Furthermore, the alumina-based sintered body contains, as unavoidable impurities, alkali metals; i.e., Group I elements of the Periodic Table following the IUPAC 1990 Recommendations. The alkali metals are lithium (Li), sodium (Na), potassium (K), rubidium (Rb), cesium (Cs), and francium (Fr).

Alkali metals readily move in the grain boundary phase. That is, alkali metals are likely to cause dielectric breakdown of the alumina-based sintered body. However, if alkali metals are contained in a high-melting-point glass phase, alkali metals become unlikely to move even at high temperature. As a result, dielectric breakdown, which would otherwise result from movement of alkali metals in the grain boundary phase, becomes unlikely to occur. Thus, the insulator of the spark plug according to the present invention exhibits high dielectric strength at high temperature.

Therefore, the spark plug according to the present invention ensures that the insulator exhibits high dielectric strength at high temperature, by virtue of the glass phase of the alumina-based sintered body containing alkali metals as well as the RE component, which shuts off electrically conducting routes.

The alkali metal content may be measured, for example, by the following method: elemental analysis is performed by means of an energy dispersive X-ray spectrometer (EDX; Model: Genesis4000; detector: SUTW3. 3RTEM), a product of EDAX Inc. attached to a transmission electron microscope (TEM; Model: HD-2000) manufactured by Hitachi, Ltd. The conditions of the analysis are as follows: acceleration voltage: 200 kV; irradiation mode: HR; spot size: 0.3 nm; and a glass phase which exists in the grain boundary phase is observed at 30 arbitrary spots therein. At the spots, the alkali metal content can be measured.

In the spark plug according to the present invention, preferably, alkali metals and the RE component are contained at predetermined proportions in the alumina-based sintered body. Thus, by use of the measured alkali metal content and the RE component content measured beforehand by quantitative analysis using EPMA or like analysis, the ratio by mass between alkali metals and the RE component as reduced to oxides thereof [alkali metal/RE] is calculated. The ratio by mass [alkali metal/RE] is calculated for each of 30 arbitrary spots in a field of observation through TEM, and the average of the 30 ratio by mass is employed. When the average ratio by mass [alkali metal/RE] is 0.01 to 1.0, preferably 0.2 to 1.0, the glass phase contains alkali metals and the RE component in respectively appropriate amounts. The higher the alkali metal content of the glass phase of the alumina-based sintered body, the better; however, when the average ratio by mass [alkali metal/RE] exceeds 0.2, the alkali metal content does not have a large effect on dielectric strength. In the spark plug according to the present invention, when the ratio by mass [alkali metal/RE] in the grain boundary phase of the alumina-based sintered body is 0.01 to 1.0, the insulator exhibits excellent dielectric strength at high temperature, and the glass phase itself is high in melting point; therefore, dielectric strength is unlikely to be deteriorated even at high temperature.

According to a preferred mode of the spark plug of the present invention, the alumina-based sintered body is formed such that the ratio by mass between the RE component and the Si component as reduced to oxides thereof satisfies the relationship: $0.45 \leq RE/SiO_2 \leq 1.2$, preferably $0.55 \leq RE/SiO_2 \leq 1$. When the ratio by mass $RE/SiO_2$ is 0.45 to 1.2, by virtue of $SiO_2$ having a high melting point, the melting point of the grain boundary phase also becomes high. Thus, the dielectric strength of the insulator at high temperature; for example, 850° C. and 900° C., is enhanced.

According to a still preferred mode of the spark plug of the present invention, the alumina-based sintered body is formed such that the ratio by mass between an $SiO_2$ component and a combination of the $SiO_2$ component and the Group II element component as reduced to oxides thereof satisfies the relationship: $0.2 \leq SiO_2/(SiO_2+Group\ II) \leq 0.75$, preferably $0.25 \leq SiO_2/(SiO_2+Group\ II) \leq 0.7$. When the ratio by mass $SiO_2/(SiO_2+Group\ II)$ is 0.2 to 0.75, $SiO_2$ and the Group II component form a eutectic composition, thereby restraining abnormal grain growth which could otherwise result from firing. Thus, high-temperature strength can be enhanced. Furthermore, the dielectric strength of the insulator at high temperature; for example, 850° C. and 900° C., can be ensured.

According to a mode of the spark plug of the present invention in which the insulator exhibits high dielectric strength at high temperature and in which high-temperature leakage can be restrained while sinterability is maintained, alumina grains have an average grain size of 2.5 μm to 6 μm, and, when an arbitrary region of the alumina-based sintered body is line-analyzed along a length of 180 μm, eight or more peaks attributable to the RE component are observed.

The method of measuring the grain size of alumina grains of the alumina-based sintered body is, for example, as follows. The surface of a sintered body is mirror-polished. The polished surface is subjected to thermal etching for 10 minutes at a temperature which is 100° C. lower than a firing temperature. The etched surface is observed by use of a scanning electron microscope (SEM), and the average crystal grain size is measured by an intercept method. When alumina grains have an average grain size of 2.5 μm to 6 μm, the glass phase can be divided by means of alumina grains without involvement of deterioration in sinterability; thus, there can be restrained high-temperature leakage, which is a phenomenon that, in spite of application of voltage, voltage does not increase.

The method of line analysis of an alumina sintered body is, for example, as follows. The surface of the sintered body is mirror-polished. While the polished surface is observed by means of SEM at about 700 magnifications, an arbitrary region of the sintered body is line-analyzed along a length of 180 μm by use of an energy dispersive X-ray spectrometry (EDS). Line analysis is conducted on the sintered body at seven different arbitrary positions. When the results of analysis at four or more of the seven positions satisfy the following four conditions, the insulator of the spark plug according to the present invention readily improves in dielectric strength at high temperature.

Condition (1): The sintered body must be such that, when the sintered body is line-analyzed along a length of 180 μm by use of EDS, eight or more peaks attributable to the RE component are observed.

Condition (2): The intensities of the above peaks attributable to the RE component must be half or greater of that of a peak which is the greatest in intensity among peaks appearing along the 180 μm line.

Condition (3): When the depth of a trough between adjacent peaks as measured from the crest of a weaker one of the adjacent peaks is not 10% or greater of that of a peak which is the greatest in intensity among peaks appearing along the line, the adjacent peaks must be counted as one peak.

Condition (4): The intensity of a certain peak must be the remainder obtained by subtracting the intensity of a peak which is the weakest in intensity among peaks appearing along the line, from the intensity indicated by the top of the certain peak.

The spark plug according to the present invention will next be described.

The spark plug according to the present invention includes a center electrode; a substantially cylindrical insulator provided externally of the outer circumference of the center electrode; and a ground electrode whose one end is disposed so as to face the center electrode via a spark discharge gap. No particular limitation is imposed on other members and configurational features of the spark plug according to the present invention so long as the spark plug is configured as mentioned above; thus, the spark plug of the present invention can employ various publicly known members and configurational features.

FIG. 1 shows a spark plug according to an embodiment of the present invention. FIG. 1(a) is a partially sectional, explanatory view showing an entire spark plug 1 of the present embodiment, and FIG. 1(b) is a sectional, explanatory view showing essential portions of the spark plug 1 of the present embodiment. In the following description with reference to FIG. 1(a), a downward direction on the paper on which FIG. 1(a) appears is referred to as a frontward direction along an axis AX, and an upward direction on the paper is referred to as a rearward direction along the axis AX. Also, in the following description with reference to FIG. 1(b), an upward direction on the paper on which FIG. 1(b) appears is referred to as a frontward direction along the axis AX, and a downward direction on the paper is referred to as a rearward direction along the axis AX.

As shown in FIGS. 1(a) and 1(b), the spark plug 1 includes a substantially rodlike center electrode 2; a substantially cylindrical insulator 3 provided externally of the outer circumference of the center electrode 2; a cylindrical metallic shell 4 which holds the insulator 3; and a ground electrode 5 whose one end is disposed so as to face the front end surface of the center electrode 2 via a spark discharge gap G and whose other end is joined to an end surface of the metallic shell 4.

The metallic shell 4 has a cylindrical shape and is formed so as to hold the insulator 3 inserted thereinto. The metallic shell 4 has a threaded portion 8 formed on the outer circumferential surface of its front portion. Through utilization of the threaded portion 8, the spark plug 1 is mounted to a cylinder head (not shown) of an internal combustion engine. When the spark plug 1 is to be mounted to a recent internal combustion engine having high output and/or an internal combustion engine having a reduced size, the nominal size of the threaded portion 8 is usually adjusted to 10 mm or less. The metallic shell 4 can be formed from an electrically conductive steel material, such as low-carbon steel.

The center electrode 2 is composed of an external material 6 and an internal material 7, which is concentrically embedded in an axial core portion of the external material 6. The center electrode 2 is fixed in an axial bore of the insulator 3 in such a manner that its front end portion projects from the front end surface of the insulator 3, thereby being held in place relative to the metallic shell 4 while being electrically insulated from the metallic shell 4. The external material 6 of the center electrode 2 is a nickel-based alloy having excellent heat resistance and corrosion resistance. The internal material 7 of the center electrode 2 is a metallic material having excellent thermal conductivity, such as copper (Cu) or nickel (Ni).

The ground electrode 5 assumes the form of, for example, a rectangular columnar body. The shape and the structure of the ground electrode 4 are designed as follows: its one end is joined to an end surface of the metallic shell 4; its body is bent at an intermediate position so as to assume a shape resembling the letter L; and its distal end portion is located so as to align with the axis AX of the center electrode 2. By virtue of the ground electrode 5 being designed in such a manner, one end of the ground electrode 5 is disposed in such a manner as to face the center electrode 2 via the spark discharge gap G. The spark discharge gap G is a gap between a front end surface of the center electrode 2 and a surface of the ground electrode 5. The spark discharge gap G is usually set to 0.3 mm to 1.5 mm. Since the ground electrode 5 is exposed to temperatures higher than those to which the center electrode 2 is exposed, it is good practice to form the ground electrode 5 from an Ni-based alloy or the like superior in heat resistance, corrosion resistance, etc., to an Ni-based alloy used to form the center electrode 2.

The insulator 3 is held by an inner circumferential portion of the metallic shell 4 via talc and/or packing or the like (not shown) and has an axial bore which extends along its axis AX and which holds the center electrode 2 therein. The insulator 3 is fixed in the metallic shell 4 in such a manner that a front end portion thereof projects from the front end surface of the metallic shell 4.

In the spark plug 1, as mentioned above, the insulator 3 includes an alumina-based sintered body which contains the silicon (Si) component, a Group II element component of the Periodic Table following IUPAC 1990 Recommendations, and the rare earth (RE) component. In the alumina-based sintered body, the intensity ratio between a strongest peak attributable to alumina and a strongest peak attributable to a crystal phase other than alumina [crystal phase/alumina] as obtained by X-ray diffraction is 0 to 0.05; and when the grain boundary phase of the alumina-based sintered body is observed under a transmission electron microscope, and the ratio by mass between an alkali metal component and the RE component as reduced to oxides thereof [alkali metal/RE] is calculated at 30 circular spots, each having a diameter of 0.3 nm, selected arbitrarily in a field of observation, the average of the ratio by mass of the 30 spots falls within a range of 0.01 to 1.0. The compounds contained in the insulator 3 and the physical properties of the insulator 3 are described above; thus, repeated description thereof may be omitted.

According to a method of manufacturing the spark plug of the present invention, first, material powders; i.e., powders of compounds which are inverted to the Al component, the Si component, the Group II component, and the RE component, respectively, through firing are mixed together. In some case, powders of the same substance as the Al component, the same substance as the Si component, the same substance as the Group II component, and the same substance as the RE component (these powders can also be referred to as material powders) are mixed together. In order to mix the material powders uniformly and to yield a highly dense sintered body, preferably, mixing is performed for eight hours or longer.

Preferably, the material powders to be mixed are such that the ratio in particle size between the compound powder which forms the Al component, and the compound powders which are inverted to an auxiliary material composed of the Si component, the Mg component, the Group II component other than the Mg component, and the RE component satisfies the relationship: $1.2 \leq$ alumina/auxiliary material $\leq 4.4$, since formation of the hexaaluminate phase is facilitated while good sinterability is ensured. The particle size of powder is the average of particle sizes measured by laser diffractometry using, for example, a microtrack particle size distribution measuring apparatus (MT-3000) manufactured by Nikkiso Co., Ltd.

A hydrophilic binder, for example, can be added to the material powders. Examples of the hydrophilic binder include polyvinyl alcohol, a water soluble acrylic resin, gum arabic, and dextrin. Examples of a solvent usable for dispersing the material powders include water and alcohol. These hydrophilic binders and solvents can be used singly or in combination of two or more species. The hydrophilic binder is used in an amount of 0.1 parts by mass to 7 parts by mass, preferably 1 part by mass to 5 parts by mass, per 100 parts by mass of the material powders. Water as solvent is used in an amount of 40 parts by mass to 120 parts by mass, preferably 50 parts by mass to 100 parts by mass, per 100 parts by mass of the material powders.

In a step subsequent to the step of mixing the material powders, a mixture of the material powders is dispersed in a solvent, and a hydrophilic binder is added to the resultant mixture, thereby yielding a slurry in which the material powders are dispersed.

Next, the obtained slurry is spray-dried through the spray dry process or the like, thereby yielding a granular substance having an average grain size of 30 µm to 200 µm, preferably 50 µm to 150 µm.

Subsequently, the granular substance is formed into a green compact. The green compact is subjected to grinding for shaping. Since the green compact is formed of the granular substance having a relatively large average grain size, the green compact exhibits excellent workability and thus can be formed into a desired shape easily and at high productivity.

The green compact which has been formed into a desired shape through grinding is subjected to a firing step. In the firing step, the firing temperature in the atmosphere is set to 1,510° C. to 1,650° C., preferably 1,550° C. to 1,650° C.; temperature is increased from 900° C. to a firing temperature at an average temperature elevation rate of 8° C./min to 20°

C./min; and the green compact is fired for 8 hours to 36 hours, thereby yielding an alumina-based sintered body. Through employment of a firing temperature of 1,510° C. to 1,650° C., the sintered body is readily densified to a sufficient degree; in the grain boundary phase, the crystal phase is readily melt into the glass phase; and abnormal grain growth of the alumina component is unlikely to occur. Thus, the dielectric strength and the mechanical strength of the yielded alumina-based sintered body can be ensured. When the average temperature elevation rate is less than 8° C./min, the melting point of the glass phase, which is a grain boundary phase, decreases excessively. Thus, abnormal grain growth of alumina grains occurs, potentially resulting in deterioration in strength. The firing temperature falls within a temperature range of 1,510° C. to 1,650° C. and is a temperature at the time when increasing temperature at the average temperature elevation rate is stopped. The firing temperature is maintained at a level within the range of 1,510° C. to 1,650° C. and may be varied in some cases within the range of 1,510° C. to 1,650° C. Also, through employment of a firing time of 8 hours to 36 hours, the sintered body is readily densified to a sufficient degree, and abnormal grain growth of alumina grains is unlikely to occur. Thus, the dielectric strength and the mechanical strength of the yielded alumina-based sintered body can be ensured.

The yielded alumina-based sintered body is particularly suitable for use as the insulator 3 of the spark plug for use in an internal combustion engine having high output. The alumina-based sintered body may be adjusted in shape again as desired. In this manner, there can be manufactured the alumina-based sintered body, and the insulator 3 formed of the alumina-based sintered body for use in the spark plug 1.

Next, the yielded insulator 3 is subjected to a center electrode attachment step of attaching the center electrode 2 to the insulator 3. Furthermore, the insulator 3 to which the center electrode 2 is attached is subjected to a metallic shell attachment step of attaching the insulator 3 to the metallic shell 4, thereby yielding the spark plug 1. In the method of manufacturing a spark plug according to the present invention, the center electrode, the insulator, and the metallic shell can be assembled together, for example, as in the case of the spark plug according to the embodiment of the present invention shown in FIG. 1.

EXAMPLES

Formation of Insulator

A material powder was prepared as follows: an alumina powder having an average particle size of 2.1 μm, an $SiO_2$ powder, powders of carbonates of Mg component, Ca component, Sr component, and Ba component, and a rare-earth-containing powder were mixed together. Subsequently, to the resultant mixture, a hydrophilic binder; for example, polyvinyl alcohol, and water serving as a solvent were added, thereby preparing a forming material slurry.

The prepared forming material slurry was spray-dried by the spray dry process, thereby preparing a forming material of spherical granular substance. Furthermore, the prepared forming material of granular substance was subjected to rubber press forming, thereby yielding green compacts, which are prototypes of an insulator.

The green compacts were subjected to external cutting by use of a resinoid wheel. Next, the green compacts were heated to 900° C. Then, the temperature was increased at the average rates of temperature increase shown in Table 5 in the atmosphere. Then, the green compacts were fired at respective firing temperatures shown in Table 5 for respective firing times of 8 hours to 36 hours. Subsequently, the fired bodies were glazed and then subjected to finish firing, thereby yielding insulators.

(Component Contents)

The amounts of components in the obtained insulators were measured by quantitative analysis using EPMA. Table 1 shows the amounts of components in the insulators.

TABLE 1

| Sample No. | $Al_2O_3$ | $SiO_2$ | MgO | BaO | CaO | SrO | $La_2O_3$ | $Nd_2O_3$ | $Pr_2O_3$ | $Y_2O_3$ | $Yb_2O_3$ |
|---|---|---|---|---|---|---|---|---|---|---|---|
| 1 | 92.59 | 4.25 | 0.21 | 0.32 | 0.78 | — | — | — | — | — | 1.85 |
| 2 | 90.07 | 3.9 | 0.11 | 0.43 | 0.34 | 0.35 | — | — | — | 4.8 | — |
| 3 | 95.4 | 2.74 | 0.13 | 0.24 | — | 0.36 | 1.13 | — | — | — | — |
| 4 | 95.68 | 2.5 | 0.12 | 0.23 | — | 0.36 | — | — | — | 1.11 | — |
| 5 | 92.38 | 4.32 | 0.22 | 0.88 | 0.27 | — | — | — | 1.93 | — | — |
| 6 | 93.88 | 0.96 | 0.72 | 1.46 | 0.91 | 0.92 | — | 1.15 | — | — | — |
| 7 | 91.75 | 4.42 | 0.32 | 0.22 | 0.45 | 0.42 | — | — | — | — | 2.42 |
| 8 | 92.77 | 1.17 | 0.72 | 1.46 | 1.48 | 1.23 | — | 1.17 | — | — | — |
| 9 | 91.76 | 1.45 | 1.33 | 1.45 | 1.54 | 1.35 | — | — | 1.12 | — | — |
| 10 | 90.82 | 4.88 | 0.34 | 0.88 | 0.42 | — | 2.66 | — | — | — | — |
| 11 | 93.37 | 1.33 | 1.28 | 1.36 | 1.45 | — | 1.21 | — | — | — | — |
| 12 | 92.13 | 3.63 | 0.32 | 0.76 | 0.48 | — | 2.68 | — | — | — | — |
| 13 | 92.06 | 2.16 | 0.44 | 1.56 | 1.02 | 0.88 | — | 1.88 | — | — | — |
| 14 | 94.21 | 2.28 | 0.34 | 0.68 | — | 0.34 | 2.15 | — | — | — | — |
| 15 | 94.19 | 2.44 | 0.28 | 0.36 | 0.45 | — | 2.28 | — | — | — | — |
| 16 | 93.61 | 3.14 | 0.24 | 0.84 | 0.44 | — | 1.73 | — | — | — | — |
| 17 | 93.37 | 3.16 | 0.19 | 0.85 | 0.42 | — | 2.01 | — | — | — | — |
| 18 | 93.29 | 2.91 | 0.22 | 0.78 | 0.39 | — | 2.41 | — | — | — | — |
| 19 | 92.63 | 3.19 | 0.14 | 0.85 | 0.42 | — | 2.77 | — | — | — | — |
| 20 | 93.92 | 2.83 | 0.22 | 0.66 | 0.27 | 0.22 | — | — | 1.88 | — | — |
| 21 | 93.40 | 3.12 | 0.20 | 0.82 | 0.24 | 0.20 | 2.02 | — | — | — | — |
| 22 | 94.80 | 2.42 | 0.12 | 0.66 | 0.28 | 0.13 | — | 1.59 | — | — | — |
| 23 | 95.87 | 1.88 | 0.18 | 0.54 | 0.12 | 0.18 | — | — | — | 1.23 | — |
| 24 | 94.36 | 2.67 | 0.19 | 0.58 | 0.24 | 0.19 | — | — | — | — | 1.76 |
| 25 | 93.12 | 1.45 | 0.72 | 1.46 | 0.91 | 0.92 | — | 1.42 | — | — | — |
| 26 | 92.1 | 1.72 | 0.64 | 1.23 | 1.33 | 1.32 | 1.66 | — | — | — | — |
| 27 | 94.2 | 1.24 | 0.35 | 1.33 | 0.88 | 0.78 | — | — | 1.22 | — | — |
| 28 | 92.89 | 1.58 | 0.72 | 1.46 | 0.91 | 0.92 | — | — | — | — | 1.52 |
| 29 | 94.83 | 1.12 | 0.32 | 1.23 | 0.78 | 0.63 | — | — | — | 1.09 | — |
| 1* | 92.34 | 1.2 | 0.61 | 1.68 | 1.44 | 1.25 | — | 1.48 | — | — | — |

TABLE 1-continued

| Sample No. | Al$_2$O$_3$ | SiO$_2$ | MgO | BaO | CaO | SrO | La$_2$O$_3$ | Nd$_2$O$_3$ | Pr$_2$O$_3$ | Y$_2$O$_3$ | Yb$_2$O$_3$ |
|---|---|---|---|---|---|---|---|---|---|---|---|
| 2* | 94.43 | 2.58 | 0.45 | 0.45 | 0.87 | — | — | — | — | 1.22 | — |
| 3* | 93.32 | 3.33 | 0.30 | 0.39 | 0.31 | 0.32 | — | — | — | — | 2.05 |
| 4* | 95.5 | 2.5 | 0.12 | 0.23 | — | 0.68 | 0.97 | — | — | — | — |
| 5* | 95.45 | 2.2 | 0.12 | 0.23 | — | 0.68 | 1.32 | — | — | — | — |

(Alkali Metal Content)

The alkali metal content of the grain boundary phases of the sintered bodies was measured through element analysis by use of an energy dispersive X-ray spectrometry (EDX; Model: Genesis4000; detector: SUTW3. 3RTEM), a product of EDAX Inc. appended to a transmission electron microscope (TEM; Model: HD-2000) manufactured by Hitachi, Ltd. Conditions of the analysis were as follows: acceleration voltage: 200 kV; irradiation mode: HR; spot size: 0.3 nm; and a region where the hexaaluminate phase and the glass phase which exists in the grain boundary phase react with each other is observed at 30 arbitrary spots therein. The average of analysis results of the 30 observed spots as expressed in % by mass on the oxide basis was taken as the alkali metal content. The ratio by mass between the alkali metal content and the RE component content obtained through qualitative analysis was calculated for each of the samples. Table 2 shows the ratio by mass of the samples.

The ratio by mass "RE/SiO$_2$" and "SiO$_2$/(SiO$_2$+Group II)" were also calculated by use of amounts obtained through qualitative analysis. Table 2 also shows the ratio by mass.

(Evaluation of Dielectric Strength)

Figure 2:
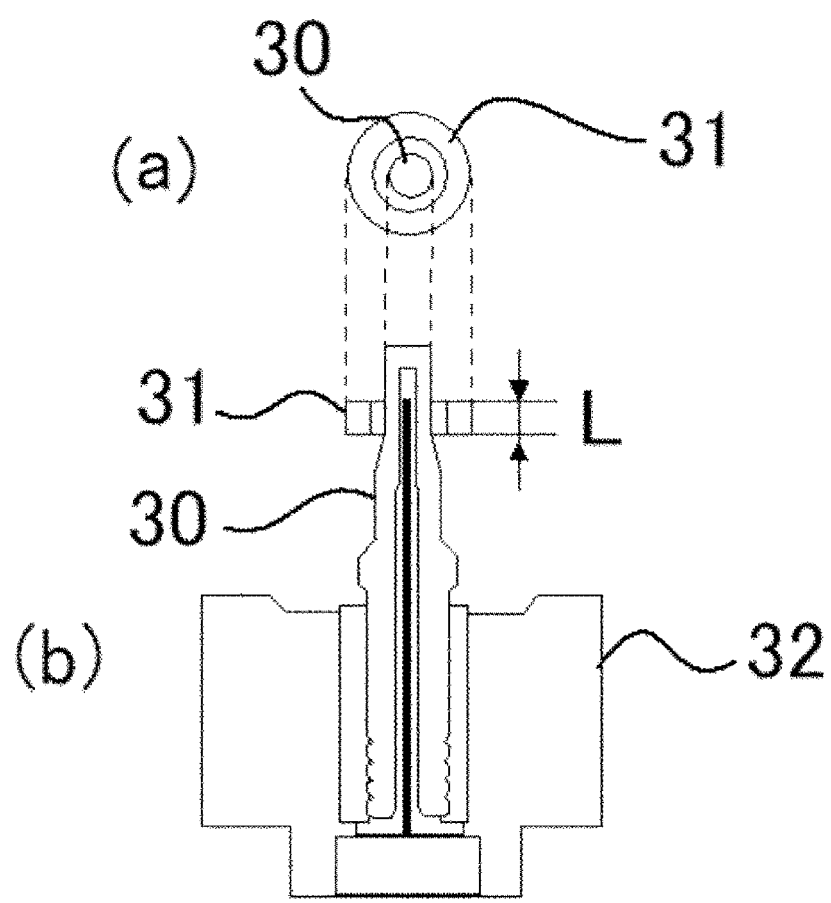

The samples were measured for dielectric strength at high temperature. FIG. 2 shows an apparatus for measuring dielectric strength. FIG. 2(a) is a top view showing a sintered body 30 and a metal ring 31 for bringing about dielectric breakdown. FIG. 2(b) is a sectional view showing the sintered body 30 and the metal ring 31. The ring 31 has an axial length L of 3 mm to 4 mm and is fixed in the vicinity of a tip of the sintered body 30 in noncontact with the tip by use of unillustrated fixing means. The sintered body 30 is fixed at one end portion thereof by means of a base member 32, and the other end portion thereof projects from the base member 32. Dielectric strength at high temperature was evaluated as follows. A portion of the sintered body 30 which projects from the base member 32 was high-frequency-induction-heated to 600° C. to 950° C. When the temperature of a portion of the sintered body 30 in proximity to the metal ring 31, the portion being readily heated, reached 800° C., 850° C., and 900° C., voltage was measured. The measured voltage was taken as dielectric strength of each of the samples. Table 3 shows the measured values of dielectric strength.

TABLE 2

| Sample No. | Alkali metal/RE | RE/SiO$_2$ | SiO$_2$/(SiO$_2$ + Group II) |
|---|---|---|---|
| 1 | 0.01 | 0.44 | 0.76 |
| 2 | 0.45 | 1.23 | 0.76 |
| 3 | 1.00 | 0.41 | 0.79 |
| 4 | 0.24 | 0.44 | 0.78 |
| 5 | 0.41 | 0.45 | 0.76 |
| 6 | 0.38 | 1.20 | 0.19 |
| 7 | 0.28 | 0.55 | 0.76 |
| 8 | 0.34 | 1.00 | 0.19 |
| 9 | 0.41 | 0.77 | 0.20 |
| 10 | 0.39 | 0.55 | 0.75 |
| 11 | 0.34 | 0.91 | 0.25 |
| 12 | 0.41 | 0.74 | 0.70 |
| 13 | 0.44 | 0.87 | 0.36 |
| 14 | 0.43 | 0.94 | 0.63 |
| 15 | 0.42 | 0.93 | 0.69 |
| 16 | 0.40 | 0.55 | 0.67 |
| 17 | 0.41 | 0.64 | 0.68 |
| 18 | 0.42 | 0.83 | 0.68 |
| 19 | 0.43 | 0.87 | 0.69 |
| 20 | 0.28 | 0.66 | 0.67 |
| 21 | 0.21 | 0.65 | 0.68 |
| 22 | 0.22 | 0.66 | 0.67 |
| 23 | 0.34 | 0.65 | 0.65 |
| 24 | 0.28 | 0.66 | 0.69 |
| 25 | 0.33 | 0.98 | 0.27 |
| 26 | 0.31 | 0.97 | 0.28 |
| 27 | 0.29 | 0.98 | 0.27 |
| 28 | 0.24 | 0.96 | 0.28 |
| 29 | 0.27 | 0.97 | 0.27 |
| 1* | 0.004 | 1.23 | 0.19 |
| 2* | 0.006 | 0.47 | 0.59 |
| 3* | 0.008 | 0.62 | 0.72 |
| 4* | 0.006 | 0.39 | 0.71 |
| 5* | 1.03 | 0.60 | 0.68 |

In Tables 1 and 2, samples "1*" to "5*" are of Comparative Examples. The content ratios "alkali metal/RE" of Comparative Examples fall outside the range of 0.01 to 1.0.

TABLE 3

| Sample No. | Dielectric strength at high temperature | | |
|---|---|---|---|
| | 800° C. | 850° C. | 900° C. |
| 1 | 18.2 | 9.2 | Unmeasurable |
| 2 | 18.5 | 5.2 | 2.5 |
| 3 | 18.5 | 5.1 | 2.5 |
| 4 | 18.7 | 9.5 | 3.3 |
| 5 | 25.6 | 13.8 | 3.4 |
| 6 | 25.8 | 13.9 | 8.5 |
| 7 | 25.9 | 15.2 | 3.5 |
| 8 | 26 | 15.4 | 8.7 |
| 9 | 26.2 | 16.1 | 11.5 |
| 10 | 26.2 | 16.3 | 11.8 |
| 11 | 26.3 | 16.4 | 14.7 |
| 12 | 26.4 | 16.5 | 14.8 |
| 13 | 26.5 | 16.5 | 14.8 |
| 14 | 27.4 | 16.8 | 14.9 |
| 15 | 27.7 | 16.9 | 14.9 |
| 16 | 27.8 | 17 | 15 |
| 17 | 27.9 | 17 | 15 |
| 18 | 28.1 | 17.1 | 15.1 |
| 19 | 28.2 | 17.4 | 15.2 |
| 20 | 27.1 | 17.1 | 15.1 |
| 21 | 26.9 | 17.2 | 14.8 |
| 22 | 27 | 17.1 | 15.1 |
| 23 | 27.1 | 16.9 | 15.2 |
| 24 | 26.6 | 16.8 | 15.1 |
| 25 | 26.8 | 16.9 | 15.1 |
| 26 | 26.5 | 16.8 | 15.2 |
| 27 | 26.8 | 17.1 | 15.1 |
| 28 | 26.3 | 16.6 | 15 |
| 29 | 27.2 | 16.8 | 14.9 |
| 1* | 8.9 | — | — |
| 2* | 8.9 | — | — |
| 3* | 9.1 | 2.8 | — |
| 4* | 9.1 | 3.1 | — |
| 5* | 7.1 | 3 | — |

For samples "1" and "1*" to "5*," dielectric strength at 900° C. could not be measured due to occurrence of dielectric breakdown. In Table 3, "-" indicates that dielectric strength was unmeasurable.

As is clear from Tables 2 and 3, the samples whose content ratio "alkali metal/RE" falls outside a range of 0.01 to 1.0 show deterioration in dielectric strength at high temperature. The samples whose content ratio "alkali metal/RE" falls within a range of 0.01 to 1.0 show excellent dielectric strength, and most of the samples maintain insulating properties even at a high temperature of 900° C. without occurrence of dielectric breakdown.

Also, as is clear from the Tables 2 and 3, as compared with samples 1 to 4, whose content ratio "RE/SiO$_2$" falls outside a range of 0.45 to 1.2, samples 5 to 29, whose content ratio "RE/SiO$_2$" falls within a range of 0.45 to 1.2, show greater improvement in dielectric strength at high temperature.

Furthermore, as is clear from Tables 2 and 3, as compared with samples 1 to 8, whose content ratio "SiO$_2$/(SiO$_2$+Group II)" falls outside a range of 0.2 to 0.75, samples 9 to 29, whose content ratio "SiO$_2$/(SiO$_2$+Group II)" falls within a range of 0.2 to 0.75, show greater improvement in dielectric strength at high temperature and less deterioration in dielectric strength even at a high temperature of 900° C.

(Measurement of Strength)

High-temperature strength of the sintered bodies was measured by a method according to JIS R 1604 as follows: test samples, each measuring 36×4×3 mm, were measured for 3-point bending strength with a span set to 30 mm. Table 4 shows the results of measurement.

(Measurement of Grain Size of Alumina)

The grain size of alumina was measured as follows. First, the surfaces of the sintered bodies were specularly polished. The polished surfaces were subjected to thermal etching for 10 minutes at a temperature which was 100° C. lower than a firing temperature. The etched surfaces were observed by use of a scanning electron microscope (SEM), and the average crystal grain size of alumina grains was measured by an intercept method. Table 4 shows the results of measurement.

(Line Analysis)

The sintered bodies were line-analyzed as follows. The surfaces of the sintered bodies were specularly polished. While the polished surfaces of the sintered bodies were observed by use of SEM (model: JSM-6460LA) manufactured by JEOL, Ltd. and set to about 700 magnifications, arbitrary regions of the sintered bodies were line-analyzed along a length of 180 μm by use of EDX (model: EX-23000BU) manufactured by JEOL, Ltd. Voltage to be applied was set to 20 kV. A Kα ray was used to identify an element associated with the intensity of a detected peak. Each of the sintered bodies was subjected to line analysis at seven different arbitrary positions thereon. When the results of analysis at four or more of the seven positions satisfy the following four conditions, detected peaks attributable to the RE component were counted. Table 4 shows the number of counted peaks.

Condition (1): The sintered body must be such that, when the sintered body is line-analyzed along a length of 180 μm by use of EDS, eight or more peaks attributable to the RE component are observed.

Condition (2): The intensities of the above peaks attributable to the RE component must be half or greater of that of a peak which is the greatest in intensity among peaks appearing along the 180 μm line.

Condition (3): When the depth of a trough between adjacent peaks as measured from the crest of a weaker one of the adjacent peaks is not 10% or greater of that of a peak which is the greatest in intensity among peaks appearing along the line, the adjacent peaks must be counted as one peak.

Condition (4): The intensity of a certain peak must be the remainder obtained by subtracting the intensity of a peak which is the weakest in intensity among peaks appearing along the line, from the intensity indicated by the top of the certain peak.

(High-Temperature Peak)

The sintered bodies were checked to see whether or not high-temperature leakage occurred. Specifically, after voltage was applied under predetermined conditions, if a voltage boosting load condition was established, it was considered to be indicative of occurrence of high-temperature leakage; and, if the voltage boosting load condition was not established, it was considered to be indicative of nonoccurrence of high-temperature leakage. By use of the same apparatus as that used above in evaluation of dielectric strength, the occurrence of high-temperature leakage was detected under the conditions of 700° C., 15 kV, and one hour. Table 4 shows whether or not high-temperature leakage occurred. The occurrence of high-temperature leakage was indicated by "Yes," and the nonoccurrence of high-temperature leakage was indicated by "No."

(Relative Density)

In order to check to see if the sintered bodies were densified, relative density was calculated. The relative densities of the sintered bodies were calculated as follows. First, an apparent density was measured by a method in accordance with JIS R 1634. By use of a theoretical density calculated from a lattice constant, and the measured apparent density, relative density was calculated. Table 4 shows the calculated relative densities.

TABLE 4

| Sample No. | High-temperature strength | Alumina grain size (μm) | Number of RE peaks (pieces) | High-temperature leakage | Relative density |
| --- | --- | --- | --- | --- | --- |
| 1 | 324 | 6.4 | 8 | No | 94.1 |
| 2 | 343 | 6.3 | 9 | No | 94.2 |
| 3 | 344 | 6.3 | 8 | No | 94.2 |
| 4 | 348 | 6.2 | 8 | No | 94.2 |
| 5 | 435 | 6.2 | 9 | No | 94.3 |
| 6 | 228 | 6.2 | 9 | No | 94.5 |
| 7 | 438 | 2.1 | 6 | Yes | 96.2 |
| 8 | 211 | 2.2 | 7 | Yes | 96.4 |
| 9 | 441 | 2.4 | 5 | Yes | 96.4 |
| 10 | 442 | 2.4 | 6 | Yes | 96.3 |
| 11 | 445 | 2.4 | 7 | Yes | 96.3 |
| 12 | 449 | 2.4 | 5 | Yes | 96.3 |
| 13 | 450 | 2.4 | 6 | Yes | 96.3 |
| 14 | 452 | 2.5 | 8 | No | 96.2 |
| 15 | 513 | 6 | 9 | No | 96.1 |
| 16 | 514 | 3.6 | 8 | No | 96.3 |
| 17 | 514 | 3.9 | 8 | No | 96.2 |
| 18 | 517 | 4.5 | 9 | No | 96.3 |
| 19 | 520 | 5.2 | 8 | No | 96.3 |
| 1* | 389 | 5.5 | 3 | Yes | 94.1 |
| 2* | 391 | 6.1 | 2 | Yes | 94.2 |
| 3* | 401 | 2.1 | 4 | Yes | 95.7 |
| 4* | 405 | 2.2 | 4 | Yes | 95.6 |
| 5* | 402 | 2.2 | 4 | Yes | 95.6 |

As is clear from Table 4, the samples in which eight or more peaks attributable to RE were detected by line analysis were free from occurrence of high-temperature leakage. Conceivably, this is for the reason that electrically conducting routes are unlikely to be formed in the sintered bodies by virtue of the RE component. Also, the samples in which eight or more peaks attributable to RE were detected and whose alumina grains had a grain size of 2.5 μm to 6 μm not only were free from occurrence of high-temperature leakage but also made improvements in high-temperature strength and relative density.

Table 5 shows the firing temperature, the firing time, and the temperature elevation rate from 900° C. in manufacture of the samples. Table 5 partially shares test data on dielectric strength and high-temperature strength with Tables 3 and 4.

TABLE 5

| Sample No. | Firing temperature (° C.) | Firing time (hours) | Temperature elevation rate (° C./min) | Dielectric strength at 900° C. | High-temperature strength |
|---|---|---|---|---|---|
| 1 | 1650 | 36 | 3 | — | 324 |
| 2 | 1600 | 12 | 4 | 2.5 | 343 |
| 3 | 1600 | 36 | 3 | 2.5 | 344 |
| 4 | 1650 | 38 | 2 | 3.3 | 348 |
| 5 | 1580 | 8 | 8 | 3.4 | 435 |
| 6 | 1560 | 11 | 3 | 8.5 | 228 |
| 7 | 1600 | 10 | 8 | 3.5 | 438 |
| 8 | 1590 | 9 | 5 | 8.7 | 211 |
| 9 | 1570 | 10 | 20 | 11.5 | 441 |
| 10 | 1540 | 11 | 12 | 11.8 | 442 |
| 11 | 1560 | 12 | 11 | 14.7 | 445 |
| 12 | 1570 | 10 | 9 | 14.8 | 449 |
| 13 | 1520 | 12 | 8 | 14.8 | 450 |
| 14 | 1530 | 11 | 12 | 14.9 | 452 |
| 15 | 1530 | 10 | 15 | 14.9 | 513 |
| 16 | 1540 | 10 | 13 | 15 | 514 |
| 17 | 1520 | 10 | 12 | 15 | 514 |
| 18 | 1560 | 9 | 11 | 15.1 | 517 |
| 19 | 1550 | 8 | 15 | 15.2 | 520 |

As is clear from Table 5, samples 5, 7, and 9 to 19 which were manufactured at a firing temperature of 1,510° C. to 1,650° C. and at an average temperature elevation rate from 900° C. to a firing temperature of 8° C./min to 20° C./min exhibit both of sufficient dielectric strength at high temperature and sufficient high-temperature strength, in contrast to samples 1 to 4, 6, and 8 which were manufactured at such a firing temperature and at such an average temperature elevation rate that failed to satisfy the above conditions.

INDUSTRIAL APPLICABILITY

The insulator of the spark plug according to the present invention can be applied to a spark plug which may be subjected to high temperatures in the course of use; for example, a spark plug for use in an internal combustion engine having high output.

DESCRIPTION OF REFERENCE NUMERALS

| | |
|---|---|
| 1: | spark plug |
| 2: | center electrode |
| 3: | insulator |
| 4: | metallic shell |
| 5: | ground electrode |
| 6: | external material |
| 7: | internal material |
| 8: | threaded portion |
| G: | spark discharge gap |
| 30: | sintered body |
| 31: | ring |
| 32: | base member |
| L: | axial length |

The invention claimed is:

1. A spark plug comprising a center electrode, a substantially cylindrical insulator provided externally of an outer circumference of the center electrode, and a substantially cylindrical metallic shell provided externally of an outer circumference of the insulator, characterized in that the insulator is formed of an alumina-based sintered body which contains a silicon component (hereinafter, referred to as an Si component), a Group II element component of the Periodic Table following IUPAC 1990 Recommendations, and a rare earth element component (hereinafter, referred to as an RE component);

the alumina-based sintered body is composed of a glass phase and an alumina crystal phase as observed through X-ray diffraction analysis; and when the grain boundary phase of the alumina-based sintered body is observed under a transmission electron microscope, and the ratio by mass between an alkali metal component and the RE component as reduced to oxides thereof [alkali metal/RE] is calculated at 30 circular spots, each having a diameter of 0.3 nm, selected arbitrarily in a field of observation, the average of the mass ratios of the 30 spots falls within a range of 0.01 to 0.45 or within a range of 0.45, not inclusive, to 1.0.

2. A spark plug according to claim 1, wherein, in the alumina-based sintered body, the ratio by mass between the RE component and the Si component as reduced to oxides thereof satisfies a relationship: $0.45 \leqq RE/SiO_2 \leqq 1.2$.

3. A spark plug according to claim 1, wherein, in the alumina-based sintered body, the ratio by mass between an $SiO_2$ component and a combination of the $SiO_2$ component and the Group II element component as reduced to oxides thereof satisfies a relationship: $0.2 \leqq SiO_2/(SiO_2+Group\ II) \leqq 0.75$.

4. A spark plug according to claim 1, wherein, in the alumina-based sintered body, alumina grains contained therein have an average grain size of 2.5 μm to 6 μm, and when an arbitrary region of the alumina-based sintered body is line-analyzed along a length of 180 μm, eight or more peaks attributable to the RE component are observed.

5. A method of manufacturing a spark plug as recited in claim 1, comprising:

a firing step of forming an insulator through firing of a green compact;

a center electrode attachment step of attaching a center electrode to the insulator; and a metallic shell attachment step of attaching, to a metallic shell, the insulator to which the center electrode is attached;

the method being characterized in that, in the firing step, temperature is raised from 900° C. to a firing temperature at an average temperature elevation rate of 8° C./min to 20° C./min and that the firing temperature is maintained within a temperature range of 1,510° C. to 1,650° C.

* * * * *